(12) United States Patent
Kress

(10) Patent No.: US 8,017,925 B2
(45) Date of Patent: Sep. 13, 2011

(54) POLYMERIZATION DEVICE

(75) Inventor: Ekkehard Kress, Wasserburg (DE)

(73) Assignee: IIE GmbH & Co. KG, Soyen (DE)

( * ) Notice: Subject to any disclaimer, the term of this patent is extended or adjusted under 35 U.S.C. 154(b) by 171 days.

(21) Appl. No.: 12/602,271

(22) PCT Filed: May 30, 2008

(86) PCT No.: PCT/EP2008/056656
§ 371 (c)(1),
(2), (4) Date: Nov. 30, 2009

(87) PCT Pub. No.: WO2008/145715
PCT Pub. Date: Dec. 4, 2008

(65) Prior Publication Data
US 2010/0163753 A1    Jul. 1, 2010

(30) Foreign Application Priority Data

May 30, 2007   (EP) ..................................... 07109246

(51) Int. Cl.
*G01N 21/00*     (2006.01)
*G01N 21/33*     (2006.01)
*G01N 21/35*     (2006.01)

(52) U.S. Cl. .............. 250/504 R; 250/492.1; 250/494.1; 250/495.1; 250/365; 118/620; 118/712; 156/275.5; 156/331.1

(58) Field of Classification Search .............. 250/504 R, 250/492.1, 494.1, 495.1, 365; 156/275.5, 156/331.1; 118/620, 712
See application file for complete search history.

(56) References Cited

U.S. PATENT DOCUMENTS

| | | | | |
|---|---|---|---|---|
| 2,875,047 A | * | 2/1959 | Oster | 430/281.1 |
| 3,099,558 A | * | 7/1963 | Levinos | 430/145 |
| 5,182,056 A | * | 1/1993 | Spence et al. | 264/401 |
| 7,881,351 B2 | * | 2/2011 | Kress | 372/35 |

* cited by examiner

*Primary Examiner* — Nikita Wells
(74) *Attorney, Agent, or Firm* — Karl F. Milde, Jr.; Eckert Seamans Cherin & Mellott, LLC

(57) ABSTRACT

A device to polymerize plastics that are to be hardened by means of UV irradiation comprises two different irradiation sources for UV irradiation and IR irradiation, respectively, whose irradiation is projected onto the plastic to be hardened. The irradiation source for the UV irradiation includes a solid-state laser.

8 Claims, 1 Drawing Sheet

POLYMERIZATION DEVICE

BACKGROUND OF THE INVENTION

The invention relates to a device to polymerize plastics to be hardened by ultraviolet (UV) irradiation.

Such devices have become known especially for the hardening of paints and inks on any surface. For this, discharge lamps are usually used that possess an emission spectrum including a more or less major component in the UV realm. Developments in this area tend toward increasing the UV component of these discharge lamps in order to be able to reduce the power requirement of the discharge lamps while maintaining the same UV output level. There has already been consideration of using laser irradiation in the UV spectrum for this hardening. Laser sources such as Excimer lasers, that have received consideration for this application because of their power output, are entirely too large and too expensive for this purpose.

SUMMARY OF THE INVENTION

It is the objective of the invention to provide a device for polymerization of plastics that may be hardened by UV irradiation whose irradiation source possesses improved energy efficiency in comparison with conventional discharge lamps, and whose hardening performance is adequately great. The irradiation source must also be of compact design.

This objective is achieved by the invention by means of a device to polymerize plastics that are to be hardened by UV irradiation which comprises two different irradiation sources for UV irradiation and IR irradiation, respectively, whose irradiation is projected onto the plastic to be hardened. The irradiation source for the UV irradiation includes a solid-state laser.

It has been found that not only UV irradiation is responsible for the hardening of plastics. The UV irradiation initiates the polymerization process and maintains it. The speed of the polymerization process, however, does not only depend on the UV irradiation. The polymerization speed is, in turn, dependent on the temperature. The additional influence of infra-red (IR) irradiation correspondingly raises the temperature. Very localized temperature increases may be caused with the help of an IR emitter, which has shown to be significantly more efficient than, for example, the increase of ambient temperature in a tunnel oven. By loading the plastic to be hardened with UV and IR irradiation, only the specific area to be hardened is heated. In this manner, even stronger heating of the plastic may be achieved than in a tunnel oven since the entire body needs not be increased in temperature, but rather only a localized area is heated that immediately cools after irradiation.

A solid-state laser that emits in the UV spectrum may be so designed that it achieves the required power output, yet is of compact design. This is possible only with simultaneous application of an IR emitter since the UV power required is thereby reduced. A solid-state laser is associated with relatively lower manufacturing cost.

The solid-state laser advantageously generates a line-shaped emission pattern in the plastic to be hardened. For example, during the drying of inks on printed articles that may be hardened by UV, the line-shaped shaped emission should extend perpendicular to the transport direction of the articles to be dried. The line must possess a length that ensures that the entire surface to be dried is covered by the line-shaped emission pattern.

A conventional IR emitter may be used as the source of IR emission. Such an IR emitter projects a field onto the plastic to be hardened that is not sharply delineated. The emission pattern of the IR emission source and of the UV should be overlapped in the case such that articles to be dried first pass through the field of the IR emission source and the plastic being hardened has sufficient time to be heated. The line-shaped pattern of the UV emission source should therefore be positioned within the area of the IR field in which the articles to be dried enter immediately after leaving the IR field. It may thus be ensured that the plastic to be hardened upon entry to the UV emission pattern is at a temperature that ensures rapid and positive drying of the plastic to be hardened.

The IR emission source also advantageously projects a line-shaped emission pattern on the plastic to be hardened. The two line-shaped emission patterns load the plastic to be hardened only for a very brief period with the necessary UV and IR energy. Since an exceedingly brief irradiation effect is involved, one may work with very high energy levels. The plastic may be brought to a higher temperature for a very brief period without damaging it than with the use of a conventional IR emitter. The hardening speed may thus be increased even more.

The IR emitter advantageously possesses a diode laser to generate the line-shaped emission pattern. Diode lasers that irradiate in the IR spectrum are of very high performance, and may also be manufactured at very low cost.

Solid-state lasers allow very good regulation of their output power. Thus, the ratio of intensities of UV and IR irradiation may be adjusted. The polymerization device based on the invention may thus be used to harden various plastics. The intensity ratio, however, is dependent not only on the plastic to be hardened itself, but rather it also varies dependent on the material and the type articles that are printed, for example, using ink that is to be hardened. In this regard, the intensities may be optimally matched.

The UV irradiation source and the IR irradiation source may consist of laser bars. These laser bars are combined into laser units that are of such dimensions that the line length required for the system is achieved.

The UV irradiation source and the IR irradiation source are advantageously mounted one above the other. Both irradiation sources may thus be simply oriented such that the UV line and the IR line are positioned exactly on the plastic to be hardened. The option exists of positioning the IR line before the UV line so that the plastic to be hardened is first brought to a higher temperature, and polymerization is initiated only thereafter.

It is particularly advantageous to position the UV irradiation source and the IR irradiation source such that the UV line and the IR line exactly coincide. The plastic to be hardened thus simultaneously receives energy of differing wavelengths required for polymerization in this manner.

For a full understanding of the present invention, reference should now be made to the following detailed description of the preferred embodiments of the invention as illustrated in the accompanying drawing.

DESCRIPTION OF THE PREFERRED EMBODIMENT

Figure 1:
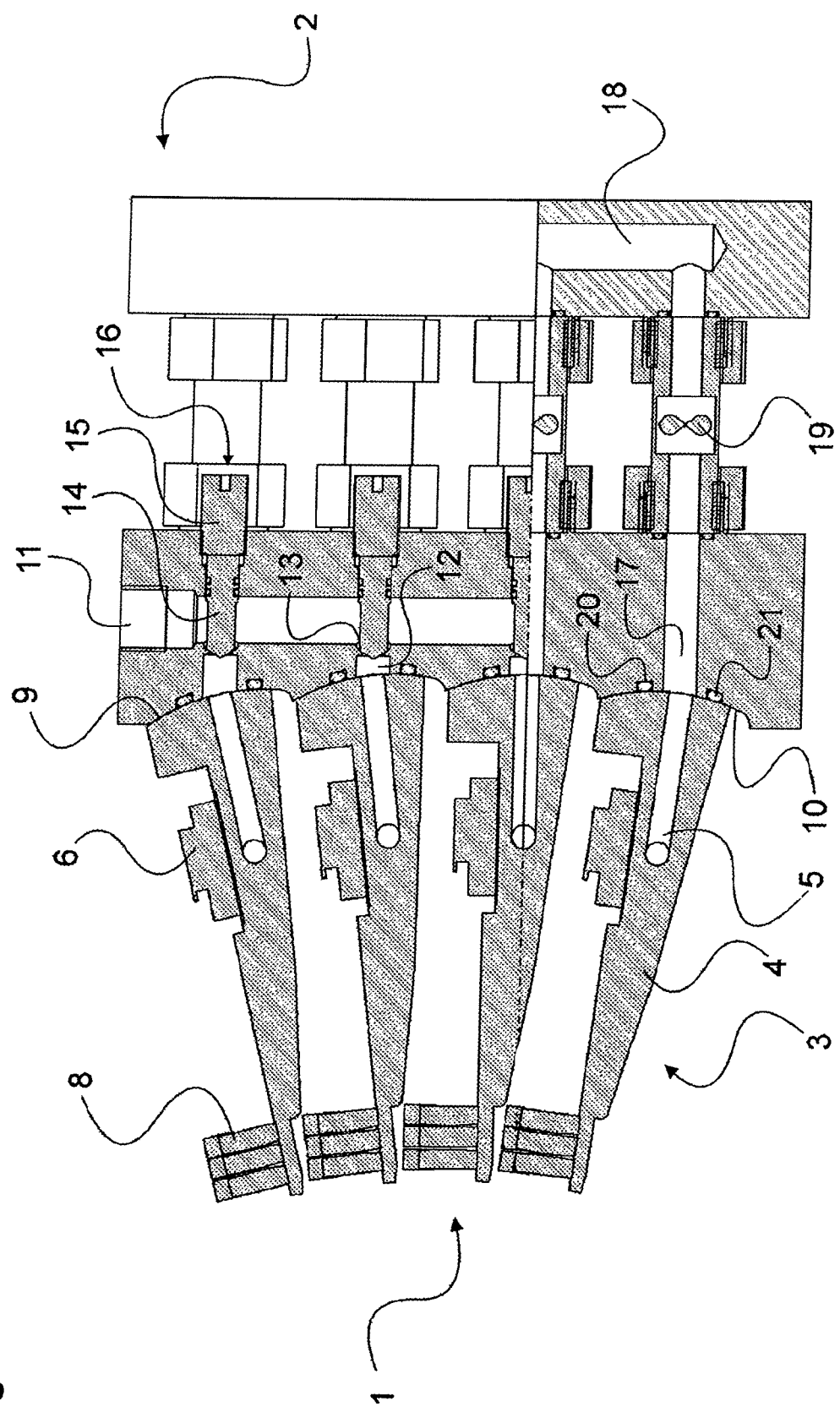
FIG. 1 is a cross section through a mounting unit with four laser units for the device based on the invention to polymerize plastics that may be hardened by means of UV irradiation.

The preferred embodiment of the present invention will now be described with reference to FIG. 1 of the drawing.

FIG. 1 shows a laser module 1, a single mounting unit 2, and four laser units 3 mounted on it. Each laser unit 3 includes a base unit 4 within which coolant channels 5 extend, a laser-diode bar 6 mounted on the base unit 4, and a collecting lens 8. The base unit 4 includes a curved adjustment surface 9 on the side opposite the collecting lens 8 that lies flat on an identically-curved mounting surface 10. The mounting surface 10 is a component of the mounting unit 2. Each laser unit 3 is mounted in the vicinity of the collecting lens 8 so that it may pivot about an axis (not shown), and is affixed in the area of the adjustment surface 9 and the mounting surface 10 by means of screws (not shown) so that it may be removed.

Each curved adjustment surface 9 and each mounting surface 10 is formed as a section of a cylinder. Its radius here corresponds to the separation of the pivot axis to the adjustment surface 9 and/or mounting surface 10.

A central coolant supply channel 11 is located within the mounting unit 2. Four supplying coolant channels 12 that lead to the individual mounting surfaces 10 branch out from the central coolant supply channel 11. The entrance of the supplying coolant channel 12 is formed by means of an injector into which a jet needle 14 extends. This jet needle 14 is permanently connected to an adjustment screw 15. The jet needle 14 and the adjustment screw 15 form the main components of a throttle 16.

A distribution coolant channel 17 leads from each mounting surface 10 to a central coolant exhaust 18. This central coolant exhaust 18 is also a component of the mounting unit 2. The route of the draining coolant channel 17 is interrupted by a flow meter 19.

A round slot 20 with a quadrangular cross section into which an O-ring 21 is inserted, is located within the mounting surfaces 10 around each aperture of the supply coolant channels 12 and of the exhaust coolant channels 17.

Within each laser unit 3, a large number of laser bars 6 (not shown) are positioned adjacent to one another. These laser-diode bars 6 of the laser units 3 emit radiation that is made parallel by means of the collimation lens positioned directly before it, thus forming a line-shaped irradiation pattern along the length of the laser units 3. Next, the laser irradiation passes through a collecting lens 8 that forms the radiation into a narrow line. The exact shape of the collecting lens 8 depends on the separation of the plastic to be hardened from the laser unit and on the necessary width of the line-shaped irradiation pattern. The width of the line depends in turn on the output power of the laser units 3 and on the speed at which the articles to be dried are fed through.

The heat generated by the laser-diode bars 6 is transferred to the coolant circulating through the coolant channels 5 of the base unit 4. The cold coolant is stored within the central coolant supply channel 11 of the mounting unit 2, and is distributed from there to the individual supply coolant channels 5 of the base unit 4. After accepting the heat from the laser-diode bars 6, the warm coolant flows through the exhausting coolant channels 17 of the mounting unit 2 into the central coolant exhaust 18.

Since the optical output of the laser units 3 depends on how much heat is removed, the volumetric flow of coolant for each laser unit 3 is individually adjusted. For this, the aperture cross-section between the jet needle 14 and the injector 13 within the supply coolant channel 12 is adjusted using the adjustment screw 15 such that the identical amount of coolant flows through each laser unit 3. In order to verify this, a flow meter 19 is positioned in each exhaust coolant channel 17.

Sealing of apertures of the coolant channels 5 of the base body 4 opposing one another, of the apertures of the supply channels 12, and of the apertures of the exhaust coolant channels 17, which contain coolant under pressure, is advantageously performed by means of O-rings 21, which are positioned within a slot 20 of the mounting surface 10.

In order to adjust the laser module 1, affixing media such as screws (not shown) are loosened, and the laser units 2 are rotated about the pivot axis until the irradiation patterns of all laser units 3 coincide on a single line on the plastic to be hardened. Since the curvatures of the adjustment surface 9 and of the mounting surface 10 are identical, the distance between the mounting unit 2 and the laser unit 3 does not change during the pivoting process. Since the laser units 3 must be ready for adjustment and must be already loaded with coolant, the O-ring 21 also provides a positive seal during pivoting such that leakage of coolant near the O-ring does not occur. The apertures of the coolant channels 5 of the base body 4 of the supply channels 12, and of the exhaust coolant channels 17, possess dimensions such that the cross-section area of the one aperture completely covers that of the opposing aperture throughout the total adjustment area. This prevents undesired narrow restrictions in the area of the coolant channels. This might otherwise lead to an increase in pressure on the O-rings 21, thus causing a leak during adjustment. Adjustment of the laser units is advantageously performed by means of the individual laser units 3 before setting the flow meter of the coolant.

The mounting of several laser units 3 on one mounting unit 2 leads to a configuration that saves much space. The use of O-rings 21 as seals replaces the use of coolant tubing or lines that would otherwise be necessary. All this leads to an extremely compact and high-performance laser module 1.

If the laser module 1 is used in a system to dry articles printed with inks that are hardened by UV, the laser units are configured with various lasers. Because of the varying output performance of UV and IR solid-state lasers, the laser module 1 is configured with three UV laser units and one IR laser unit. The position of the various laser units is not important since all irradiation patterns are superimposed onto a single line.

The laser module 1 may be installed, for example, above a conveyor belt on which the articles to be dried are transported. The line of the superimposed irradiation patterns of the four laser units 3 here extends crosswise to the transport direction of the articles to be dried, and possesses a length that approximately matches the width of the conveyor belt. It may thus be ensured that each article is loaded with the identical irradiation dose, thus leading to a uniform degree of drying after passage under the laser module.

There has thus been shown and described a novel device to polymerize plastics which fulfills all the objects and advantages sought therefor. Many changes, modifications, variations and other uses and applications of the subject invention will, however, become apparent to those skilled in the art after considering this specification and the accompanying drawing which discloses the preferred embodiment thereof. All such changes, modifications, variations and other uses and applications which do not depart from the spirit and scope of the invention are deemed to be covered by the invention, which is to be limited only by the claims which follow.

What is claimed is:

1. A device to polymerize plastics to be hardened by ultraviolet (UV) irradiation, the improvement comprising two different irradiation sources for UV irradiation and infrared (IR) irradiation for application to the plastic to be hardened, wherein the irradiation source for the UV irradiation includes a solid-state laser; and further comprising means for adjusting the ratio of intensities of the UV irradiation and the IR irradiation with respect to each other.

2. Polymerization device as in claim 1, wherein the solid-state laser projects a line-shaped irradiation pattern onto the plastic to be hardened.

3. Polymerization device as in claim 2, wherein the IR irradiation source projects a pattern onto the plastic to be hardened that is not sharply delineated.

4. Polymerization device as in claim 2, wherein the IR irradiation source projects a line-shaped irradiation pattern onto the plastic to be hardened.

5. Polymerization device as in claim 4, wherein the IR irradiation source includes a diode laser.

6. Polymerization device as in claim 2, wherein the UV irradiation source and the IR irradiation source comprise laser bars.

7. Polymerization device as in claim 6, wherein the UV irradiation source and the IR irradiation source are mounted one above the other.

8. Polymerization device as in claim 7, wherein the UV irradiation source and the IR irradiation source are oriented such that their irradiation patterns are projected onto the same line on the plastic to be hardened.

* * * * *